June 16, 1925. 1,542,346
W. C. HOOVER ET AL
METHOD AND APPARATUS FOR GRINDING HARD RUBBER
Filed Sept. 19, 1923 2 Sheets-Sheet 2

Inventors
William C. Hoover.
Ambrose Dwyer.
By Robert M Pierson
Atty.

Patented June 16, 1925.

1,542,346

UNITED STATES PATENT OFFICE.

WILLIAM C. HOOVER AND AMBROSE DWYER, OF AKRON, OHIO, ASSIGNORS TO THE B. F. GOODRICH COMPANY, OF NEW YORK, N. Y., A CORPORATION OF NEW YORK.

METHOD AND APPARATUS FOR GRINDING HARD RUBBER.

Application filed September 19, 1923. Serial No. 663,586.

*To all whom it may concern:*

Be it known that we, WILLIAM C. HOOVER and AMBROSE DWYER, citizens of the United States, residing at Akron, in the county of Summit and State of Ohio, have invented a certain new and useful Method and Apparatus for Grinding Hard Rubber, of which the following is a specification.

This invention relates to the art of grinding vulcanized hard rubber to produce fine hard rubber dust suitable for use in compounding, the present application being in part a continuation of our application Serial No. 588,760 filed September 18, 1922.

Heretofore, so far as we are aware, the practice has been to grind the rubber in open, slow speed mills, such as rubber mixing mills, with consequent discomfort to workmen because of the permeation of the air by the finely divided rubber and gases evolved in the grinding thereof, and also with great danger of fire and explosion due to the highly inflammable character of the dust and gases with which the atmosphere about the mill becomes charged.

It has been known that the grinding of hard rubber is facilitated by heat, and to a certain extent and in an imperfect manner the frictional heat evolved in the open, slow speed mills has been utilized for this purpose, but the temperatures thereby obtained in the rubber at the instant it is ground have been comparatively low, and have widely varied even as between pieces simultaneously ground, because of the application of the heat from one side only of the charge of material and because of the erratic progress of the particles being ground, in their movement toward the nip of the rolls. Moreover, the temperature has been purposely kept low, by circulating a cooling fluid in the rolls, keeping them at a temperature of about 200° F., such low temperature being considered necessary to reduce the fire and explosion hazard.

Because of the strength of hard rubber against crushing forces, it has also been considered necessary to pass it between grinding elements held together by positive, mechanical means, and high speed mills having grinding elements such as rolls adapted to act upon the material under their own centrifugal force have never been used or considered suitable for the grinding of hard rubber, so far as we are aware.

Even with the tightest setting of the mills heretofore used it has been necessary to pass the hard rubber through the mill several times and then to screen the product, in order to obtain dust of the desired fineness in substantial quantity, and in consequence of these several matters the grinding of hard rubber has been a slow and expensive process, as well as a dangerous one.

The general object of our invention is to provide improved procedure and apparatus for economically and safely grinding hard-rubber. More specific objects are to reduce the fire and explosion hazards, to obtain a more uniformly fine hard rubber dust, to avoid discomfort and injury to workmen, and to obtain an increased production in proportion to the outlay of equipment and labor.

We have discovered that by producing in the hard rubber a higher temperature than heretofore has been commonly employed, and in combination therewith so speeding a centrifugal mill as to produce higher pressures than commonly have been used therein for other materials, a very rapid crushing of hard rubber may be obtained, and by the means hereinafter described the above stated objects may be attained. We find, for example, that when such a mill is operated at a speed producing a pressure of about 5,500 lbs. between a grinding ring of 36 inch diameter and a grinding roll of 11 inch diameter and 7 inch tread, a pronounced increase of production occurs when the temperature of the charge is raised to about 260° F., and that even higher temperatures may be used with advantage, the best temperature depending somewhat upon the character of the hard rubber stock being ground, and we have found that it is possible, notwithstanding the high speed and high temperatures employed, to provide against ignition of the rubber particles, floating dust or gases, which would otherwise be an ever present danger due to the local generation of intense heat by the high speed mill, and due to the tendency to spontaneous combustion in the warm, finely ground, sulphurous product. In fact we find that we are able not only to grind the rubber safely in a high speed mill, but that much higher temperatures may be employed advantageously than have been found practicable in the types of mills heretofore used, and that the charge may be kept at a more uniform temperature throughout than has heretofore been obtained, with consequent uniformity of product and increase of production.

In accomplishing these objects we preferably provide means for keeping the charge of material in the mill in motion, so as to disperse locally heated portions of the charge, means for passing an even temperatured, gaseous current, preferably a current of inert gases, through the mill, whereby the temperature of the charge may be closely regulated and the finely ground material carried away, and means for conducting a heating or cooling fluid in close proximity to the grinding elements of the mill so as accurately and directly to regulate the temperature thereof to provide the best heat conditions for rapid production and at the same time prevent such local generation of heat by said grinding elements as to ignite the contents of the mill.

We also provide means for collecting the hard rubber dust from the current of gases by which it is carried from the mill, said means and the mill preferably constituting a substantially closed circuit, and when inert gases are used as a conveying medium for the product we preferably provide means whereby the gas pressure within the mill and conduits with which it is in communication may be maintained slightly higher than atmospheric pressure so as to avoid the formation of an explosive mixture by leakage of air into the system.

Of the accompanying drawings, Fig. 1 is a side elevation, with parts broken away and in section, of grinding and separating apparatus embodying and adapted to carry out a preferred form of our invention.

Fig. 6 is an elevation of a part of a dust collector having a valve therein and means for opening and closing said valve.

Figure 1:
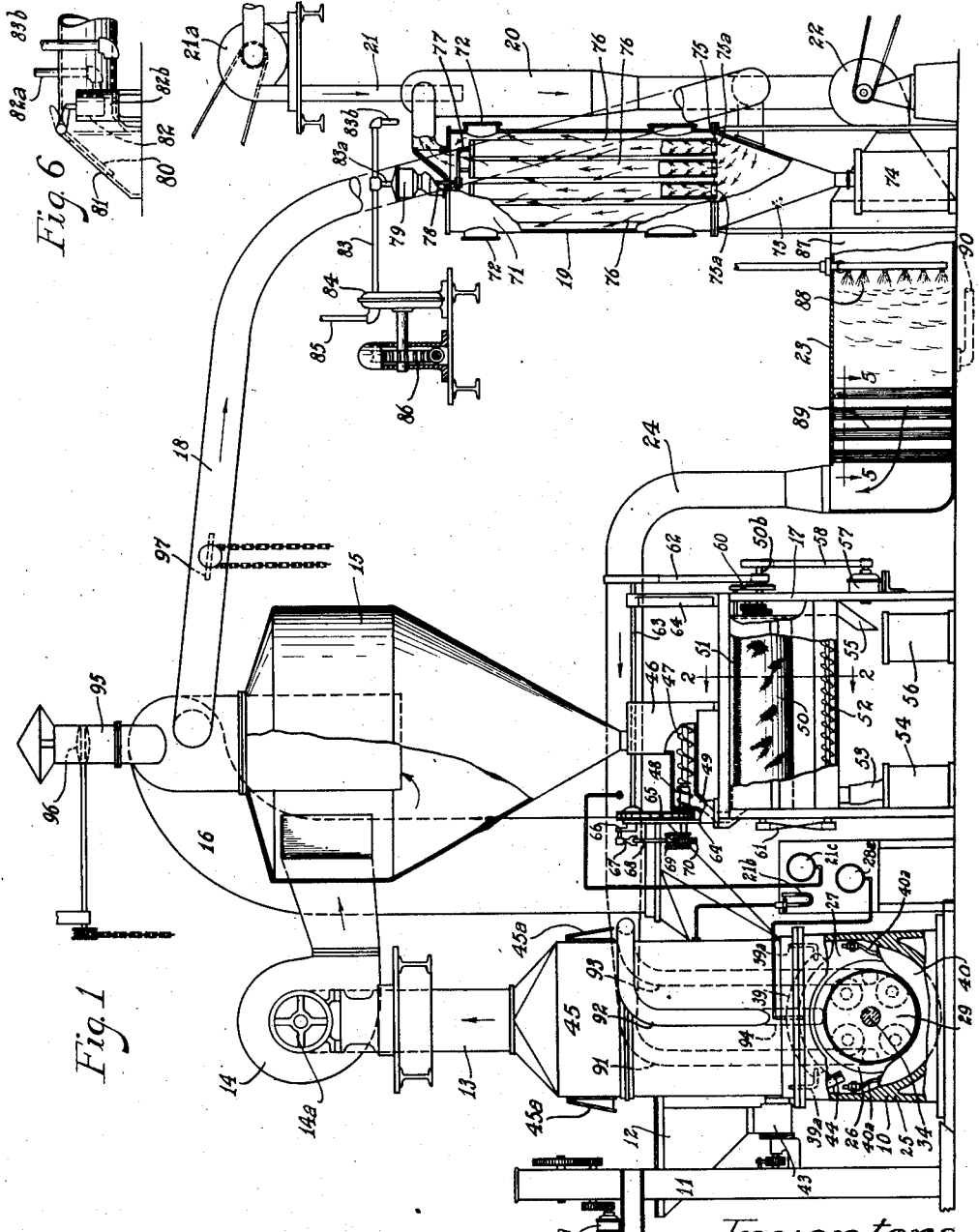
Figure 2:
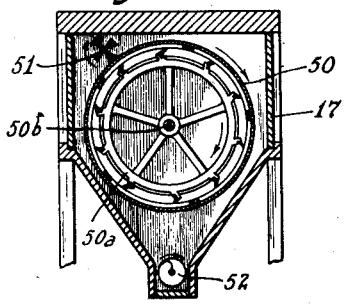
Fig. 2 is a section on line 2—2 of Fig. 1, showing a rotary screen.

Referring to the drawings, the apparatus comprises an enclosed mill or grinder 10, an elevator 11 having a motor 11ª and adapted to raise the material to be ground from a bin beneath the floor and dump it into the hopper 12 of the mill, a conduit 13 having therein a fan or blower 14, the latter being provided with a motor 14ª, and said conduit leading from the casing of the mill to a centrifugal air separator 15, a conduit 16 leading from the top of said separator back to the mill, a sifter 17 adapted to receive material from the centrifugal separator, a conduit 18 leading from the top of the centrifugal separator to the bottom of a dust collector or air filter 19, a conduit 20, having a gas-intake pipe 21 leading thereinto and provided with a blower 21ª, and said air conduit 20 leading from the top of said dust collector to a water-screen device 23, a fan or blower 22 in said conduit 20, and a conduit 24 leading from said water screen device to the mill.

The mill 10 comprises a casing 25 in which an internally cylindrically grooved grinding ring 26 is supported in a vertical plane, at a medial position in said casing, by a partition-like casting 27 extending across the casing and formed with an open space at its center of substantially the same diameter as said ring, the latter non-rotatably fitting within an annular flange 28 on said casting, and the central opening of said casting accommodating a rotor 29. Said rotor is formed with spaced-apart recesses 30, 30 on its outer periphery, in which recesses respectively are mounted grinding rollers 31, 31, the latter being preferably formed with cylindrical treads and with journals 32, 32 rotatably and slidably mounted in radial slots 33, 33 formed in said rotor, said rollers being adapted to run in a grinding or crushing action against the ring 26 under the centrifugal force imparted to them by rotation of the rotor. The rotor is secured upon a shaft 34 extending through a wall of the casing 25 and adapted to be driven at high speed by a motor (not shown).

Figure 4:
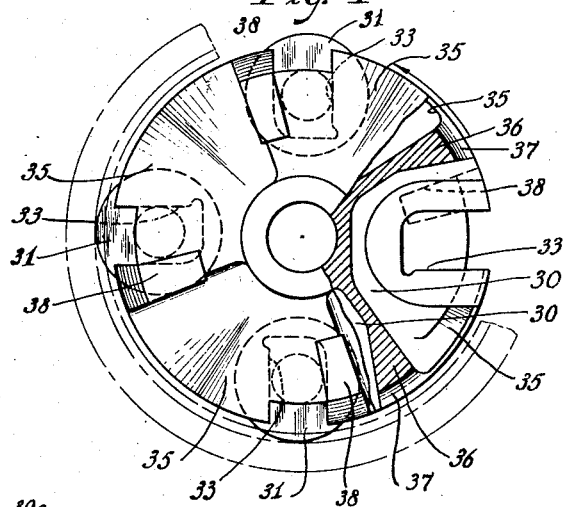
Fig. 4 is an elevation, partly broken away and in section, of a rotor constituting a part of the grinding device, as viewed from the left of Fig. 3.
Figure 3:
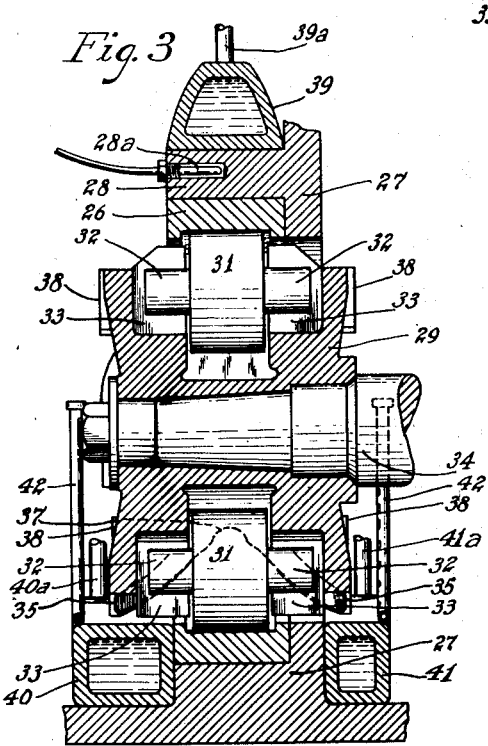
Fig. 3 is a section on line 3—3 of Fig. 1, showing parts of the grinding device.
Figure 5:
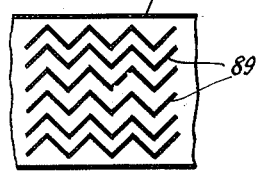
Fig. 5 is a section on line 5—5 of Fig. 1, showing baffle plates in the water screen.

For crowding the material into the groove of the ring 26 from the space within the casing at each side of the rotor, the latter is formed on its periphery with pairs of flanges or plows 35, 35, Figs. 3 and 4, having their leading ends opening out at opposite sides of each roller 31 and their rear portions converging toward the middle line of the rotor's periphery. The body of the rotor between adjacent recesses 30 has the form of a web, 36, 36, Fig. 4, and each of said webs is formed with a groove 37 at the periphery of the rotor adapted to permit said web to pass over material thrown in the way of the adjacent roller 31 by the plows 35. The rotor is formed on its sides with projections 38, 38 constituting agitators for stirring up the material to be ground, which is poured about the rotor by means hereinafter described, to assure its proper feeding to the grinding rollers, and to prevent excessive local generation of heat and to throw particles of the material upward from the rotor in order that the finer particles may be carried away by the gaseous current, as hereinafter described.

Water or steam jackets 39, 40, 41, provided with suitable supply and outlet pipes such as 39ª, 40ª, and 41ª, are secured to the casting 27, about the rotor, to prevent excessive temperatures during the grinding or to warm up the stock at the beginning of the grinding, said jackets being adapted to have either water or steam circulated through them. 28ª is a temperature recording device having its bulb mounted in the flange 28 adjacent the ring 26, where it is adapted to record with close accuracy the temperature at which the rubber is pulverized. A perforated pipe 42 is also mounted in the casing 25 at each side of the rotor and adapted to inject jets of air or gas to stir up the fine dust to which the material is ground, to dissipate locally generated heat and to cause the dust to rise and be carried from the mill, through the conduit 13, to the centrifugal separator 15, by the action of the blower 14.

The hopper 12 of the mill is provided below with a screw-feed device 43, which may be of any known or suitable construction, for uniformly feeding the material into the mill through spouts emptying on opposite sides of the casting 27, one of said spouts being shown at 44 in Fig. 1. The lower part of the conduit 13 is enlarged, constituting a chamber 45 over and in direct communication with the interior of the casing 25, and said chamber is provided with glassed observation windows 45ª, 45ª. The chamber 45, by reason of its large size with relation to the adjacent conduits, constitutes a separating chamber, through which the general velocity of the current of air or gas will be slow as compared with the velocity in said conduits, so that a proper selective separation of the material may be had therein. Said chamber may be internally provided with suitable baffle plates (not shown) for insuring an efficient separating action of the current.

The sifter 17 comprises a feed box 46 connected with the delivery spout of the centrifugal separator 15 and having therein a slow, intermittently acting screw 47 adapted to deliver the material from the separator to a fast, continuously driven screw 48, the latter being journaled on the shaft of the former and adapted to feed the material, through a spout 49, into one end of a rotary, cylindrical cloth screen 50 within the main compartment of said sifter. A long rotary brush 51 is mounted in contact with the exterior of said screen and adapted to be rotated in a direction opposite to that of the screen's rotation to brush off such material as adheres to the screen after passing therethrough.

Within the screen 50 is a rotary agitator 50ª secured to a shaft 50ᵇ upon which said screen is journaled, the agitator being adapted to be driven in the same direction as the screen but at higher speed. In a trough at the bottom of said main compartment is a screw 52 adapted to deliver, from said compartment, through a spout 53 into a covered container 54 thereunder, the material which passes through the screen 50. At the delivery end of the rotary screen 50 and adapted to receive the tailing therefrom is a chute 55 emptying into a receptacle 56 thereunder. The mechanism for driving the several moving parts of the sifter comprises a motor 57, from which a belt 58 runs to a pulley on the shaft 50ᵇ of the agitator 50ª, a belt 60 connecting said shaft with the rotary brush 51, a belt 61 operatively connecting said shaft 50ᵇ with the screw 52, and a belt 62 operatively connecting said shaft 50ᵇ of the agitator with a shaft 63 mounted in brackets 64, 64 rising from the sifter. A sprocket chain 65 connects a sprocket on said shaft 63 with a sprocket secured upon the fast screw 48, the latter being journaled upon the shaft of the intermittent screw 47 as above described. Secured upon the end of the shaft 63 is a crank 66 connected by a pitman 67 with the upper arm of a two-armed lever 68, to the lower arm of which is hinged a pawl-arm 69 adapted to drive the screw 47 through a ratchet wheel 70 secured on the shaft thereof.

The dust collector 19 comprises an upright casing 71 having observation windows 72, 72 and a tapered lower portion 73 emptying into an enclosed receptacle 74. The space within said tapered portion, into which the conduit 18 opens, is separated from the space above by a diaphragm 75 of rigid material, through apertures in which are closely fitted metal collars 75ª secured to the open lower ends of vertical, dust-collecting, cloth tubes or filters 76, 76 having closed upper ends attached to respective arms of a supporting spider 77, the later having a stem 78 extending upward through the cover of the casing 71 and being secured to a piston in an air-cylinder vibrator 79 mounted on top of said casing.

The conduit 20 leads off from an aperture in the cover of the casing 71 and is provided with a damper or valve 80 (Fig. 6) adapted alternatively to close a port 81 in the wall of said conduit or to shut off said conduit from the dust collector 19. A small air cylinder 82 provided with an inlet pipe 82ª leading from a source of constant fluid pressure is adapted normally to hold the valve 80 in closed position over the port 81, and a larger cylinder 82ᵇ, is adapted to move said valve, overcoming the force of the small cylinder 82, to open said port and shut off the conduit 20. For occasionally so shutting off the conduit 20 and actuating the vibrator to shake the collected dust from the tubes 76 into the receptacle 74, an air pipe 83 leads, through branches 83ª, 83ᵇ, respectively to the vibrator 79 and to the cylinder 82ᵇ from a distributor-valve device 84, the latter having an inlet pipe 85 and a worm-drive 86, connected with a suitable driving means (not shown) and adapted at intervals to throw the pipe 85 temporarily into communication with the pipe 83.

The pipe 18, taking off from the top of the centrifugal separator 15 is of small diameter compared with the direct return pipe 16, but the blower 22 is normally run at such high speed as to return the greater part of the current from the centrifugal separator to the mill through the smaller pipe 18 and the air filter 19 rather than through the larger, direct, return pipe 16. When the pipe 20, and consequently the blower 22, are momentarily closed off from the dust collector or air filter 19 as just described, however, the current naturally returns to the mill through the large, direct pipe 16, and as the pipe 18 takes off from a point of comparatively low pressure in the circuit 13—16, only a weak current, if any, flows through the pipe 18 at such times, although the port 81 is at such times opened to the atmosphere, the dust thus being permitted to fall by gravity from the cloth tubes 76.

The gas intake pipe 21 leads into the pipe 20 from a source of inert gas, such as washed or purified gases of combustion from a furnace, (not shown) which consist so largely of nitrogen and carbon-dioxide as to form a non-explosive mixture with the hard rubber dust, efficient combustion being had in the furnace. The blower 21$^a$ is adapted to inject said inert gases into the system at such rate as to maintain an internal gas pressure preferably slightly above atmospheric pressure practically throughout the system, and the several conduits are preferably so proportioned and the several fans so operated as to assure a super-atmospheric pressure especially within the enclosed mill itself, where the temperature is highest and leakage most prevalent. A U-tube pressure indicating device 21$^b$, and a device 21$^c$, which may be of known construction, for indicating the carbon-dioxide content of the gases within the system, are provided, as shown in Fig. 1, so that danger incident to low pressure or deficiency of inert gases within the system may be detected.

The water screen device 23 comprises a casing 87, through which the pressure side of the blower 22 communicates with the conduit 24, and a water spray 88 and a set of baffles 89 therein, said baffles being adapted to cause an intimate mixing of the air or gases passing through the device with the water from said spray to wash and cool said air or gases. A drain pipe 90 is provided at the bottom of the casing 87 for disposing of the polluted water.

The conduit 24 branches adjacent the mill 10, its four branches 91, 92, 93, 94, entering the chamber 45 at different points near its bottom, being thus adapted to assist in cooling the mill by injecting currents of relatively cool and preferably inert gases from the water screen device 23.

A conduit 95 leads from the conduit 16 at the top of the centrifugal separator to the outer atmosphere, said conduit being provided with a damper 96, for controlling the pressure within the system, and a damper 97 is provided in the conduit 18, so that the relative amount of air or gases flowing directly back to the mill from the centrifugal separator and that flowing through the dust collector 19 and the water screen device 23 before returning to the mill may be accurately controlled, and so that said dust collector may be cut out of the system on occasion, as in case the very fine graded dust obtainable thereby is not desired.

In the operation of the apparatus to produce hard rubber dust, the several mechanisms being driven at suitable speeds, the elevator 11 continuously raises from the bin below the hard rubber to be ground, which preferably is in small lumps, and pours, it into the hopper 12 of the mill 10, from which it is evenly fed into the latter, by the screw feed device 43, through the spouts 44 at each side of the rotor 29. The plows 35 throw the material under the rollers 31, which crush it against the ring 26 under the centrifugal force imparted to them by rotation of said rotor, the agitators 38 keeping the material in motion and thereby helping to push it into the way of the plows 35. Jets of air or gas from the pipes 42 stir up the finely divided particles so that, locally generated heat is dispersed and so that said particles are caught by the current and carried away. Steam is preferably circulated through the jackets 39, 40, 41 at the beginning of the grinding operation to warm up the stock quickly, and water is then circulated through them to prevent excessive local development of frictional heat in the mill.

The finely-ground material being carried to the centrifugal separator 15, as above described, substantially all of it, except the very fine particles, falls into the feed box 46 of the sifter 17 and is graded by the latter, fine particles suitable for rubber compounding falling into the receptacle 54 and the tailing being received by the container 56. While such tailing may be sufficiently fine for certain uses, they may be returned to the bin and run through the mill again if a larger product of the finer dust is desired.

While usually the air currents are so balanced, by controlling the speeds of the blowers 14 and 22 and adjusting the dampers 96, 97, that a part of the material which is not precipitated in the centrifugal separator 15 is returned through the conduit 16 to the mill, a considerable part thereof is drawn through the conduit 18 by strong suction of the fan 22 and collected in the dust collecting or filtering device 19, where it collects on the inner surfaces of the cloth tubes 76, providing an extremely fine dust, which from time to time is shaken into the receptacle 74 by the agitation of said tubes, the latter being shaken by the air-cylinder agitator 79.

As the fan 21ª constantly impels inert gases into the system and a corresponding quantity of gases or gases mixed with air escape from other parts of the system, particularly through the flue or conduit 95, the development of an explosive mixture in the system is avoided.

The operation is continuous and automatic throughout, the operator being required only to remove the finished product, and as the system is substantially closed throughout, objectionable dust in the atmosphere about the apparatus is largely avoided.

In the operation of the apparatus as described the heat resulting from the friction of the grinding rollers in their bearings and from the crushing of the stock is not only prevented from igniting or unduly softening the stock, but is so uniformly distributed and regulated as to maintain the charge of rubber at the desired temperature for efficient grinding, the latter being encompassed by a gaseous medium of substantially the same temperature on all sides. We are thus enabled safely to grind the rubber at much higher temperatures than heretofore have been practicable, and we find that the grinding of the usual grades of hard rubber improves as the temperature rises as high as 300° F., a very marked increase of production being obtainable at temperatures between 220° F., and 265° F. While we find it preferable to use inert gases as the circulating medium, especially at the higher temperatures, our invention is not wholly limited thereto, since with the equalization of temperatures within the mill and the confining of the ground material within the enclosed system, away from open lights, lighted matches, and similar hazards, the rubber may be ground at substantially higher temperatures than have heretofore been employed and with safety although air be used as the circulating medium.

We have found that the cylindrical form of the rolls 31 and of the grinding ring's groove in which they run is an important advantage in conjunction with a rotor having slots in which the roll is journalled, in that it avoids tilting and cramping of the roller against the rapidly driven rotor, such as frequently occurs in the use of the crowned rollers heretofore considered essential in rotors of this type. One of the greatest causes of excessively high local temperatures is thus avoided. We find that the simple rolling action of the cylindrical roller, when driven at the high speeds employed, is effective to crush the hard rubber, and that the lateral crushing action incident to the crowned form of rollers heretofore used for other materials in mills of this general type is not necessary.

Modifications may be resorted to without departing from the scope of our invention, and we do not wholly limit our claims to the specific construction or the exact procedure shown and described.

We claim:

1. The method of grinding hard rubber which comprises encompassing a quantity thereof with a gaseous medium at a temperature above 220° F., pulverizing the rubber while it is so encompassed, and separating the pulverized rubber from said medium.

2. The method of grinding hard rubber which comprises crushing the rubber by passing the same through a high speed mill while so controlling the frictional heat of said mill as to maintain a substantially uniform temperature therein such as to facilitate the grinding of the rubber without ignition thereof.

3. The method of grinding hard rubber which comprises encompassing a quantity thereof in an inert gaseous medium at a temperature such as to facilitate the grinding of the rubber, and pulverizing the rubber while it is so encompassed, while impelling said medium past the pulverizing position to carry off finely divided particles of the rubber, and separating said particles from said medium.

4. The method of grinding hard rubber which comprises encompassing a quantity thereof in a gaseous medium at a temperature between 220° and 300° F., pulverizing the rubber while it is so encompassed and while impelling said medium to carry off the pulverized particles, and separating said particles from said medium.

5. The method of grinding hard rubber which comprises crushing the rubber by passing the same through a high speed, enclosed mill while so regulating the frictional heat thereof as to facilitate the grinding of the rubber and passing a gaseous current through the mill to carry off the ground particles.

6. The method of grinding hard rubber which comprises subjecting a charge of the same, in small pieces, to a succession of violent, crushing impacts while agitating the charge and causing a rapid circulation of a gaseous medium therethrough whereby the temperature of the charge is equalized and finely pulverized particles are carried therefrom.

7. The method of grinding hard rubber which comprises pulverizing the rubber in a substantially closed pneumatic circuit at a temperature above 220° F., circulating combustion gases through said circuit to carry the more finely divided particles of rubber from the position where it is pulverized, and separating said particles from said gases at another part of the circuit.

8. The method of grinding hard rubber which comprises submitting it to a crushing action in an inert fluid medium at an elevated temperature such as to facilitate the grinding of the rubber, and separating the ground particles from said fluid medium.

9. In apparatus for grinding hard rubber, the combination of an enclosed, centrifugal mill, a roller constituting a grinding element therein and adapted to crush the rubber by its centrifugal force, means for driving said mill at such high speed as to soften the rubber by frictional heat, means for impelling a gaseous current through said mill to carry off the ground rubber, and means for separating said ground rubber from said current.

10. In apparatus for grinding hard rubber, the combination of an enclosed mill, means for driving said mill at such high speed as to soften the rubber by frictional heat, enclosed, fluid jacket means juxtaposed to a grinding element of said mill for controlling the temperature thereof, means for impelling a gaseous current through said mill to carry off the ground rubber, and means for separating said ground rubber from said current.

11. In grinding apparatus the combination of an enclosed, high speed mill, a conduit leading from the enclosure thereof, air-separating means in said conduit, means for controlling the temperature of said mill, means for so agitating the charge of material in said mill as to dissipate locally generated frictional heat, and means for impelling a gaseous current through said mill, conduit and air separating means.

12. In grinding apparatus the combination of an enclosed mill, a conduit leading from the enclosure of said mill, an air separator in communication with said conduit, means for impelling a gaseous current through said mill, conduit and separator, and closed, fluid-circulating means within said mill for controlling the temperature therein, said mill comprising a rotor, a grinding ring surrounding said rotor, and rolling, grinding members impelled by said rotor and adapted to crush the stock being ground against said ring under centrifugal action imported to them by rotation of said rotor.

13. In grinding apparatus the combination of an enclosed, high speed mill, fluid-circulating means juxtaposed to the grinding elements of said mill for controlling the temperature thereof, means for agitating the charge in said mill, means for circulating a gaseous current through the enclosure of said mill to carry the ground material therefrom, and means for separating said material from said current.

14. In grinding apparatus the combination of a substantially closed pneumatic circuit, an enclosed mill in said circuit, air-separating means in said circuit, and means for circulating a gaseous current in said circuit and substantially preventing sub-atmospheric pressure therein by injection of an inert gaseous medium thereinto to compensate for leakage from the circuit.

15. In grinding apparatus the combination of a substantially closed pneumatic circuit, an enclosed mill, air-separating means, and a blower in said circuit, a conduit leading into said circuit, and a blower in said conduit.

16. In grinding apparatus the combination of an enclosed high speed mill, a conduit leading from the enclosure of said mill, air-separating means in said conduit, the space within said mill, conduit and air-separating means being substantially out of communication with the surrounding space in which the operator works, and means for supplying inert gas and impelling it through said mill, conduit and separating means at super-atmospheric pressure.

17. Grinding apparatus comprising a casing internally provided with an annular grinding surface, a jacket associated with said surface and adapted for the circulation of a fluid therethrough to control the temperature of said surface, a rotor within said casing, a grinding roller associated with said rotor and adapted to coact with said grinding surface under centrifugal force imparted to it by rotation of said rotor, means for impelling a gaseous current through said casing to carry off ground material, and means for separating said ground material from said current.

18. Grinding apparatus comprising an enclosed mill, means for separating finely divided material from a gaseous current, said means and said mill being connected in a substantially closed pneumatic circuit, means for circulating a gaseous current in said circuit, a conduit constituting a by-pass with relation to said circuit, means for impelling a gaseous current through said by-pass, and means for cooling the last said current as it passes through said by-pass.

19. Grinding apparatus comprising an enclosed mill, means for separating finely divided material from a gaseous current, said means and said mill being connected in a substantially closed pneumatic circuit, means for circulating a gaseous current in said circuit, a conduit constituting a by-pass with relation to said circuit, means for impelling a gaseous current through said by-pass, means in said by-pass for separating finely divided material from a gaseous current, and means in said by-pass for cooling a gaseous current therein.

20. Grinding apparatus comprising an enclosed mill and means for separating finely divided material from a gaseous current, said means and said mill constituting parts of a substantially closed pneumatic circuit, means for circulating a gaseous current in said circuit, means for supplying combustion gases to said circuit and means for modifying the temperature of said gases as they initially pass to said mill.

21. Grinding apparatus comprising an enclosed mill and means for separating finely divided material from a gaseous current, said means and said mill constituting parts of a substantially closed pneumatic circuit, means for circulating a gaseous current in said circuit, means for supplying combustion gases to said circuit and means for washing said gases as they initially pass to said mill.

22. Grinding apparatus comprising a casing provided internally with an annular grinding surface therein, a rotor mounted in said casing and formed with a pair of radially disposed bearing recesses, a cylindrical roller formed with trunnions journalled in said recesses, said roller being adapted to coact with said annular surface in a grinding action, and means for driving said rotor at such high speed as to crush particles of hard rubber between said surface and said roller under the centrifugal force of the latter.

23. Grinding apparatus comprising a casing, internally provided with a cylindrical grinding surface, a rotor in said casing, a cylindrical roller adapted to be driven by said rotor, to run on said grinding surface and to cooperate therewith in a grinding action under centrifugal force imparted to it by its rotation with said rotor, and means for driving said rotor at such high speed as to crush particles of hard rubber between said roller and said ring.

24. The method of grinding hard rubber which comprises submitting it to a crushing action at an elevated temperature in a space substantially out of communication with that in which the operator works.

25. The method of grinding hard rubber which comprises submitting it to a crushing action at an elevated temperature in an inert atmosphere.

26. The method of grinding hard rubber which comprises submitting it to a crushing action, at an elevated temperature, in an inert gaseous medium, transporting the ground material on a current of said inert gaseous medium, and separating the ground material therefrom.

In witness whereof we have hereunto set our hands this 12th day of September, 1923.

WILLIAM C. HOOVER.
AMBROSE DWYER.